United States Patent [19]

Baddour et al.

[11] Patent Number: 5,476,595
[45] Date of Patent: Dec. 19, 1995

[54] ZEBRA MUSSEL CONTROL DEVICE FOR WATER INTAKES

[75] Inventors: Raouf E. Baddour; Walter J. Lenson, both of London, Canada

[73] Assignee: The University of Western Ontario, London, Canada

[21] Appl. No.: 245,570

[22] Filed: May 18, 1994

[51] Int. Cl.$^6$ ............................................. C02F 1/48
[52] U.S. Cl. .................. 210/748; 210/170; 210/243; 204/149; 204/302; 422/6; 422/22
[58] Field of Search .................... 210/748, 243, 210/170; 204/149, 302; 422/6, 22

[56] References Cited

U.S. PATENT DOCUMENTS

| | | | |
|---|---|---|---|
| 5,096,601 | 3/1992 | Muia et al. | 210/755 |
| 5,160,047 | 11/1992 | McCarthy | 210/749 |
| 5,256,310 | 10/1993 | Brooks | 210/747 |
| 5,294,351 | 3/1994 | Clum et al. | 210/774 |
| 5,368,748 | 11/1994 | Sanderson | 210/748 |
| 5,376,282 | 12/1994 | Chang | 210/750 |
| 5,389,266 | 2/1995 | Clum et al. | 210/747 |

Primary Examiner—Neil McCarthy
Attorney, Agent, or Firm—R. Craig Armstrong

[57] ABSTRACT

A zebra mussel control device uses a combination of electrical current and air bubbles to kill or disable mussels entering water intakes. The current is fed between electrodes that extend radially at equiangular positions around a cylindrical inlet of the water intake. Bubbles are created by an annular air chamber of the water intake below the cylindrical inlet. The bubbles rise, and pass through the gaps separating adjacent electrodes. Mussels entering the gaps are moved upwardly in the gaps by the action of the bubbles, thus increasing the normal transit time of the mussels through the gaps. In the result, the mussels are subjected to electrical current for a longer time than would be the case without the bubbles, and are disabled for a time sufficient to ensure that they pass through the water intake without attaching. The bubbles also drag any drifting mussels away from the water intake. This arrangement has been shown to be a very effective way to control zebra mussel blockage of water intakes.

16 Claims, 6 Drawing Sheets

ZEBRA MUSSEL CONTROL DEVICE FOR WATER INTAKES

BACKGROUND OF THE INVENTION

This invention relates to a device for controlling the quantity of zebra mussels entering submerged water intakes, and more particularly to a device utilizing both electrical current and air bubbles for such control.

Zebra mussels were first discovered in Canada in Lake St. Clair in 1988. They appear to have been transported to North America from Europe in the ballast of a ship in 1985 or 1986. The rapid colonization of these mussels in the Great Lakes and connecting rivers has raised issues of both environmental and economic importance. One particular concern is the blockage of water intake pipes. Zebra mussels adhere strongly to virtually any surface, and accumulate in multilayer colonies. The cost of controlling such mussels at water intake pipes in Canada and the United States could reach billions of dollars by the year 2000.

Water intakes pipes in North America were not designed to cope with zebra mussels, and the extent of the problem and its solutions may differ from the European experience. Many methods to control zebra mussels have been identified in the European literature, those methods being classified as physical, mechanical and chemical. The physical methods include heat, ultrasound, ultraviolet waves, and electricity. The chemical methods, which are in wide use in Europe, involve use of chlorine, ozone and other biocides and are now being used to control zebra mussels at water intakes in Canada and the United States. There are, however, many growing environmental and health concerns associated with use of chlorine and other biocides. Because of these concerns, chemical methods are considered temporary solutions. Also, chemical biocides cannot be safely applied in the regions where they are most needed, i.e. outside water intakes. In the result, additional resources are needed to periodically remove zebra mussels from entrances of water intakes and protective grids.

SUMMARY OF THE INVENTION

The invention was developed because of the need for an environmentally safe way to control zebra mussels at water intakes. It uses a combination of electric current and air bubbles. Since the tissues and organs of living organisms are conductive to electricity, electric currents have significant physiological effects on the behaviour of living organisms. Electrical methods have been used, for example, to capture and control fish movement in water from at least as early as 1863, as can be witnessed by a British patent granted to a person called Baggs in that year.

Studies were conducted at the University of Western Ontario on the effect of electric currents on zebra mussel veligers (larvae). A series of current densities and waveforms were used. Tests were conducted on zebra mussel veligers in a pumphouse in Port Stanley, Ontario in 1992, and at the University of Western Ontario in 1993. Responses were examined under dynamic and static conditions. The test apparatus involved specially-designed microscope slides and static chambers.

The first stage of veliger response was characterized by a sudden retraction of velum at an RMS current density as low as 3.5 mA/cm$^2$. Once affected by the electric shock the free-swimming veligers immediately sank, and were paralyzed for time durations dependant on the current density and exposure time. Shocked veligers sank in calm water at a velocity of 0.003 meters/second. At RMS current densities of 10 to 12 mA/cm$^2$, 60% of affected veligers had not recovered after 15 minutes. The final stage of the response was characterized by a visible darkening of internal organs, followed by death. The current density required to kill veligers decreased as the exposure time was increased. It was also found that pulsating alternating current waves produced more potent peak densities and controlled veligers more effectively than continuous alternating current waves.

The control device of the invention uses electric current and air bubbles (the electric/bubble deterrent) to effectively control zebra mussels at all stages of development. The electric current paralyzes free-swimming veligers entering the intake pipe for a period of time that exceeds their residence time in the intake pipe. The screen of bubbles optimizes the performance of the electric/bubble deterrent by creating turbulence and dragging drifting mussels away from the intake. Turbulence between electrodes increases the time a mussel is exposed to electricity, and hence reduces the power required to operate the electrodes. Unless the depth of water above the intake is very large, the reduction of electric power is found to be greater than the power required to operate the air compressor.

The zebra mussel control device of this invention has specific application to vertical bellmouth water intake pipes such as those found in the Great Lakes. The control device takes different forms: one form may be installed on an existing intake pipe, while another form may be incorporated into the design of new intake pipes.

In one form, the invention is a zebra mussel control device adapted to be fitted over a water intake pipe that extends vertically and has a top cover and a cylindrical side opening below the top cover. The control device has an electrode support member on which are supported a series of electrodes at equiangular positions, and an annular air chamber adapted to be fitted around the water intake pipe below the cylindrical side opening. The support member is adapted to be supported on the top cover, and is sized such that a peripheral portion extends beyond that cover. Each electrode is attached to the peripheral portion of the support member so as to extend normal to that member outside of the top cover. Each electrode is radially oriented on the support member and is electrically insulated from that member. The length of the electrodes is such that they substantially cover the cylindrical side opening of the intake pipe. An electrical current is adapted to flow between adjacent electrodes. The air chamber has a series of apertures for releasing air from the chamber. The released air flows upwardly, as bubbles, through gaps between the electrodes. When the device is in use the flow of air bubbles through the gaps creates a water turbulence which increases the destructive effect of the electrical current flowing across the gaps on any zebra mussels entering the water intake through the gaps.

The peripheral portion of the support member may have a series of radial fingers extending at equiangular positions, with each electrode being supported by a respective radial finger. The electrical current flowing between adjacent pairs of electrodes may be driven by an intermittent alternating voltage waveform. The intermittent voltage waveform may be a series of spaced single waveforms of 60 hertz frequency, and each of the single waveforms may be separated from adjacent single waveforms by a time interval approximating ten times the period of the waveform.

This form of the control device may also include an intermittent voltage waveform power supply having first and second electrical output wires. Every second electrode supported on the support member is connected to the first output wire, and all of the other electrodes are connected to the second output wire. The intermittent voltage waveform power supply may alternatively have first and second and third electrical output wires. In such case, every third electrode supported on the support member is connected to the first output wire, every electrode on the one side of each of the third electrodes is connected to the second output wire, and every electrode on the other side of every third electrode is connected to the third output wire. The annular air chamber may have a circular cross-section.

In another form, the invention is a zebra mussel control device for a water intake, and includes a funnel member, a cover member, a series of electrodes, and an annular air chamber. The smaller end of the funnel member is adapted to be fitted to a pipe of the water intake. An axis of symmetry of the funnel member extends generally vertically. The larger end of the funnel member has a circumference extending generally horizontally. The cover member has a circumference in spaced parallel relationship with the circumference of the funnel member. The series of electrodes extends generally vertically between the circumference of the funnel member and the circumference of the cover member. Each electrode extends generally radially on the cover member and is separated from each adjacent electrode by a gap of uniform size. An electrical current is adapted to flow between adjacent electrodes. The annular air chamber surrounds the funnel member, and has a series of apertures for releasing air from the chamber. When the device is in use the released air flows upwardly, as bubbles, through the gaps between the electrodes, creating a water turbulence which increases the destructive effect of the electrical current flowing across the gaps on any zebra mussels that enter the water intake through the gaps.

In this form of the invention, the funnel member and the cover member may each have a series of radial fingers connected at equiangular positions on its circumference. Each electrode is mounted to extend between one of the fingers on the funnel member and a corresponding finger on the cover member. Each radial finger may be integrally connected to either the funnel member or the cover member. The electrical current flowing between adjacent pairs of electrodes may be driven by an intermittent alternating voltage waveform.

Further features of the invention will be described or will become apparent in the course of the following detailed description.

BRIEF DESCRIPTION OF THE DRAWINGS

The invention will next be described by means of two preferred embodiments, utilizing the accompanying drawings in which.

DETAILED DESCRIPTION OF THE PREFERRED EMBODIMENT

Figure 1:
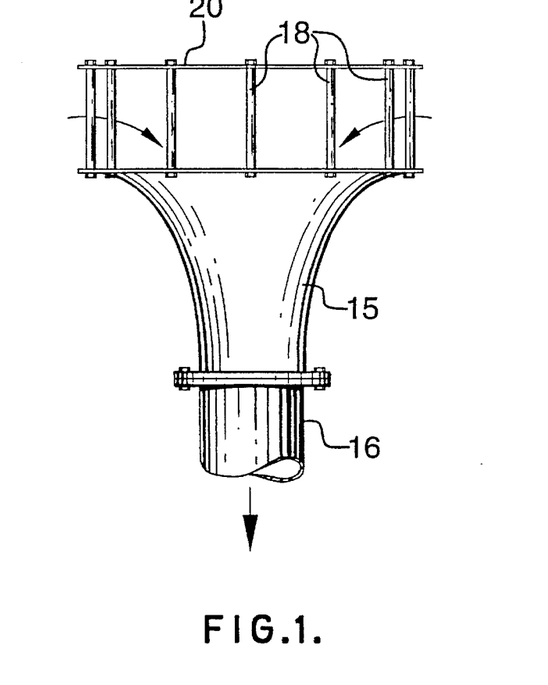
FIG. 1 is a side view of a first type of existing vertical water intake pipe.
Figure 2:
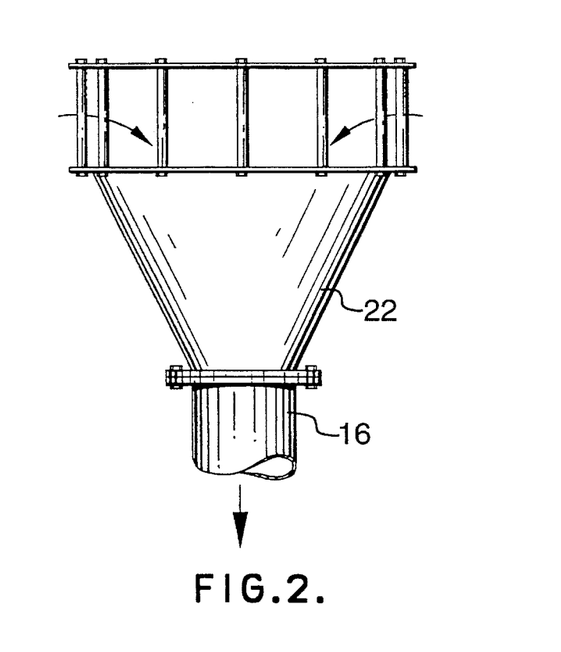
FIG. 2 is a side view of a second type of existing vertical water intake pipe.
Figure 3:
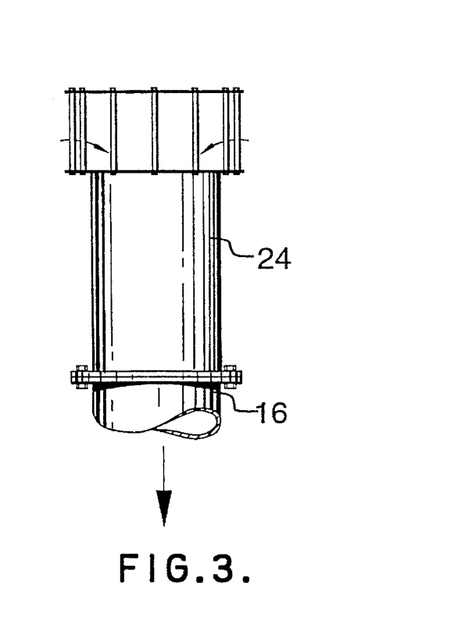
FIG. 3 is a side view of a third type of existing vertical water intake pipe.

Illustrated in FIGS. 1, 2 and 3 are three types of existing water intakes. In FIG. 1 a flared funnel 15 has its smaller lower end bolted to a vertical inlet pipe 16. One end of a set of rods 18 are secured at equiangularly-spaced intervals to the flared upper end of funnel 15, and the other end of the rods 18 are secured to the periphery of a cap 20. The water intakes of FIGS. 2 and 3 differ from the intake of FIG. 1 only in that the funnel 22 in FIG. 2 has a frustoconical shape, while the cylinder 24 in FIG. 3 has a similar diameter to inlet pipe 16.

Figure 4:
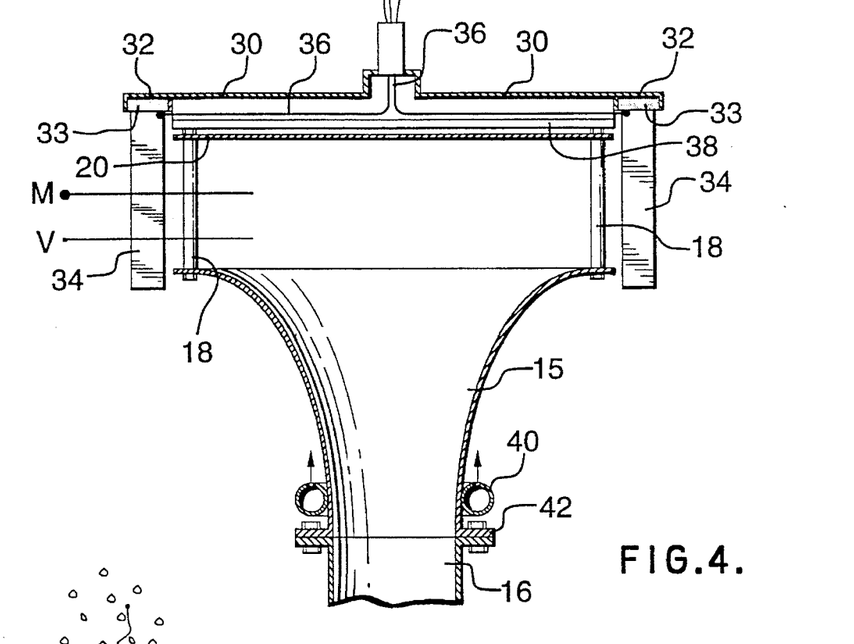
FIG. 4 is a sectioned side view of a first embodiment of the zebra mussel control device of the invention, the device being shown fitted over the existing vertical water intake pipe of FIG. 1.
Figure 5:
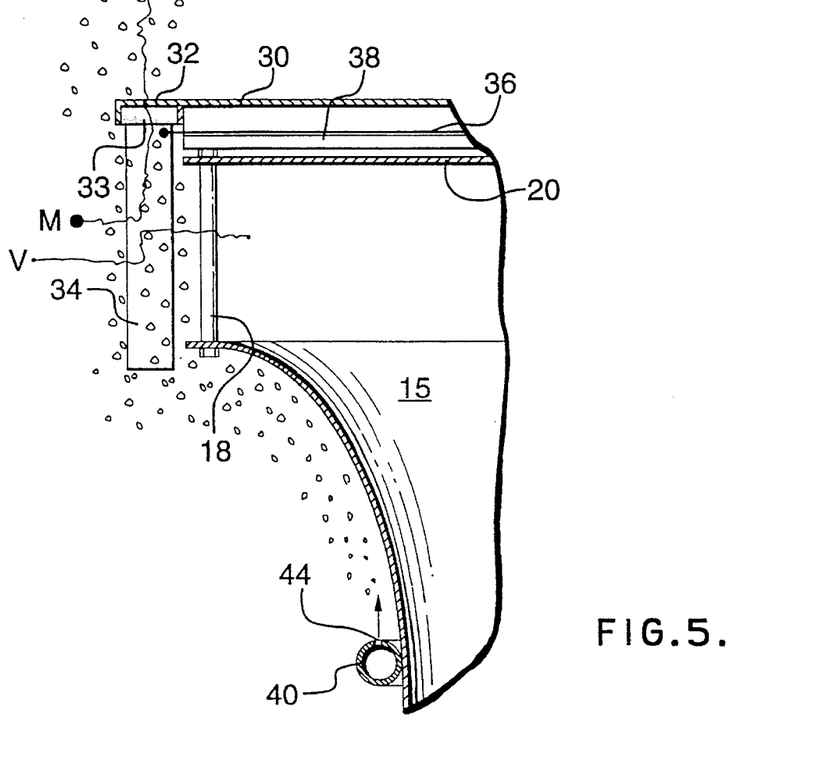
FIG. 5 is an enlarged view of a portion of FIG. 4, the view illustrating the flow of air bubbles along an outside surface of the funnel portion of an existing vertical intake pipe and across electrodes of the control device.

In the sectioned side view of FIG. 4 one form of the zebra mussel control device is shown fitted over the water intake of FIG. 1. This form of the control device has a support member 30 with radial fingers 32 extending beyond the periphery of cap 20; this construction is illustrated in the top view of the second embodiment of FIG. 9. Each of the radial fingers 32 is fitted with an insulator 33 from which hangs an electrode 34. Each electrode 34 is connected to one of a series of electrical wires 36, as will be more fully described with respect to FIGS. 10 and 11. The electrical wires 36 are insulated from cap 20 by an insulating plate 38 that rests on the other end of the rods 18. An annular air chamber 40 extends around the lower smaller end of funnel 15 adjacent the flange 42 which holds funnel 15 to vertical inlet pipe 16. Chamber 40 has a series of upwardly-facing spaced holes 44. FIG. 5 is an enlarged portion of FIG. 4, and illustrating bubbles flowing over electrode 34.

FIGS. 4 and 5 illustrate the effect of bubble flow on adult mussels (M) and veligers (V). Adult mussels are approximately the same size as the diameter of the bubbles, and the bubble flow has a greater effect on them; drifting mussels are dragged away from the water intake. Veligers are sized smaller than the diameter of the bubbles, and the bubbles have a smaller influence on their trajectory.

Figure 6:
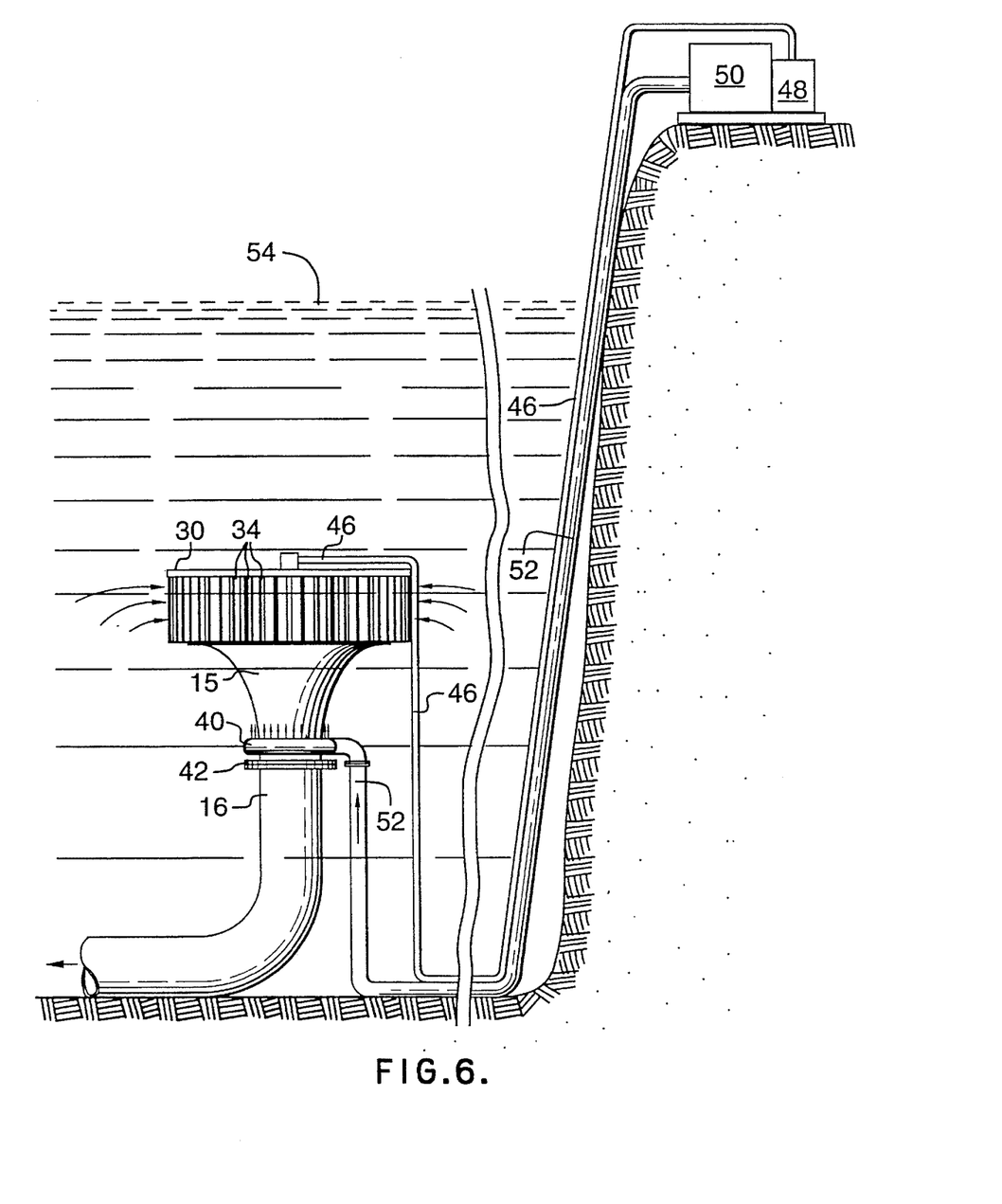
FIG. 6 is a side view of the first embodiment of the zebra mussel control device, the view also illustrating the vertical water intake pipe over which the device is fitted, and also showing the air compressor and the intermittent voltage waveform power supply.

An overall side view of the first form of the control device is shown in FIG. 6. Electrical wires 36 leave the top of the control device through a waterproof steel casing 46 which extends underwater to a land-based power supply 48 that generates an intermittent voltage waveform. The electrical circuitry within the power supply 48 is subsequently described with reference to FIG. 12. A landbased air compressor 50 pumps air to annular chamber 40 through an underwater pipe 52.

Figure 7:
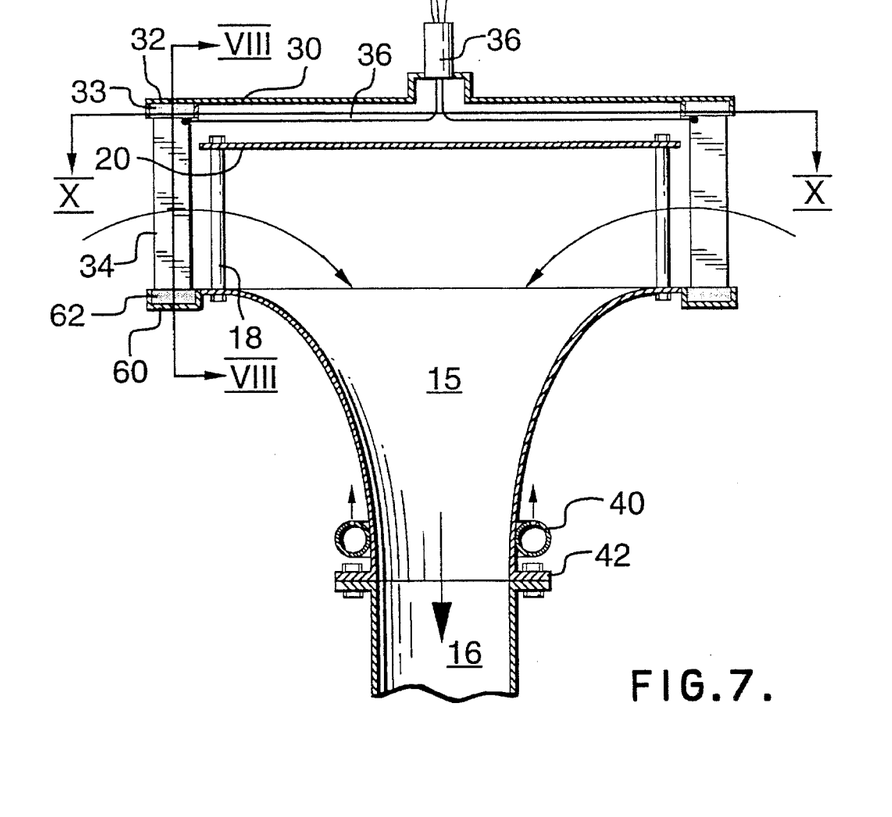
FIG. 7 is a sectioned side view of a second embodiment of the zebra mussel control device of the invention, the device including a bellmouth water intake pipe.
Figure 8:
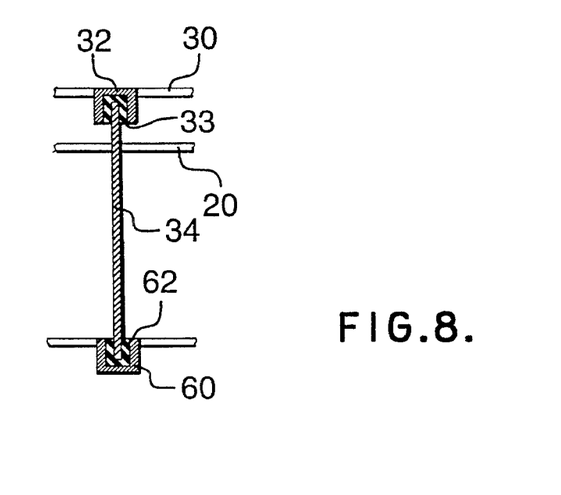
FIG. 8 is a sectioned end view of an electrode supported on the second embodiment of the zebra mussel control device, the view being along line VIII—VIII in FIG. 7.
Figure 9:
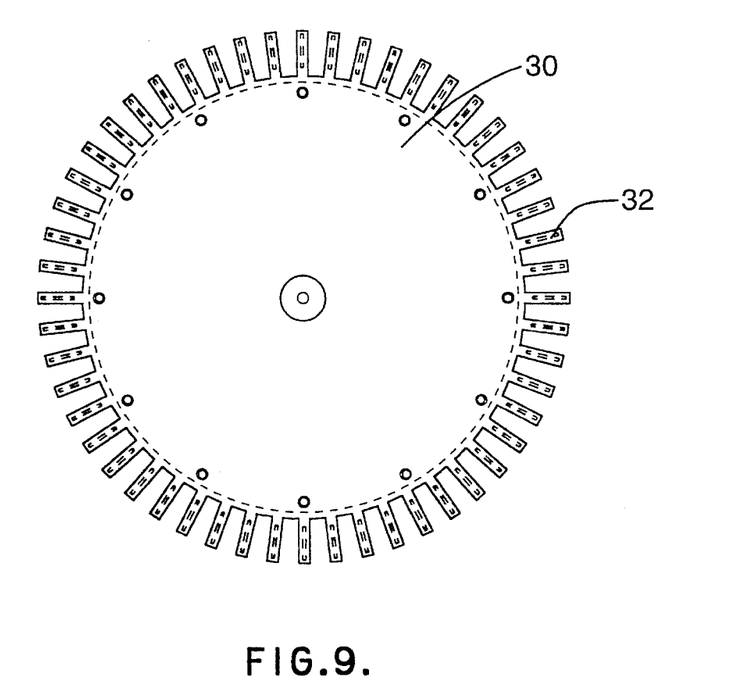
FIG. 9 is a top view of the second embodiment of the zebra mussel control device of the invention.

FIGS. 7, 8 and 9 illustrate a second form of the zebra mussel control device. This form is similar to the first, except that the control device includes the flared funnel 15, the larger upper end of which has a series of fingers 60 each fitted with an insulator 62 that holds the bottom of a respective one of the electrodes 34. Instead of being fitted around an in-situ funnel 15, annular chamber 40 is prefitted to a funnel 15 of the control device, which is then simply bolted onto an existing vertical inlet pipe 16.

Figure 10:
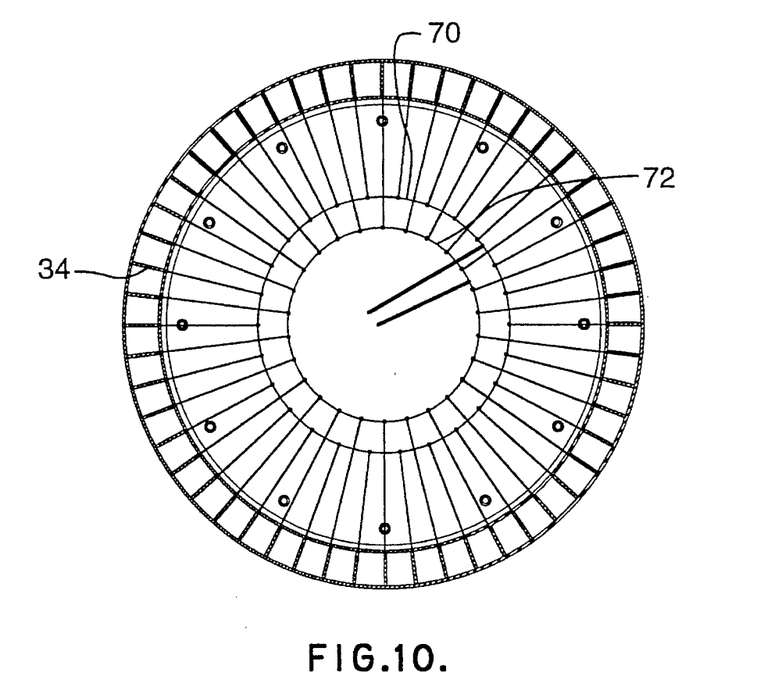
FIG. 10 is a sectioned top view of the second embodiment of the zebra mussel control device, the view being along line X—X in FIG. 7 and illustrating electrodes connected to a two-wire electrical supply.
Figure 11:
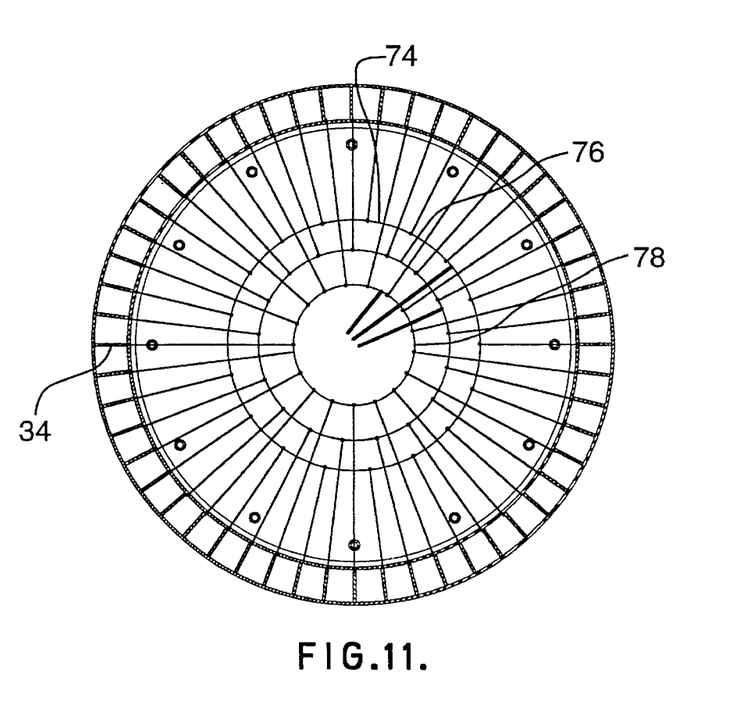
FIG. 11 is an alternate sectioned top view to that shown in FIG. 10, the view illustrating electrodes connected to a three-wire electrical supply; and, FIG. 12 is a schematic view of the electrical circuit of the intermittent voltage waveform power supply.

Two arrangements for the electrical connections to the electrodes 34 are shown in FIGS. 10 and 11. FIG. 10 shows an arrangement using two wires 70 and 72 carrying a single-phase voltage, and FIG. 11 illustrates an arrangement using three wires 74, 76 and 78 carrying a three-phase voltage. The voltage differential between wires induces a current flow between adjacent electrodes in either of the arrangements.

Figure 12:
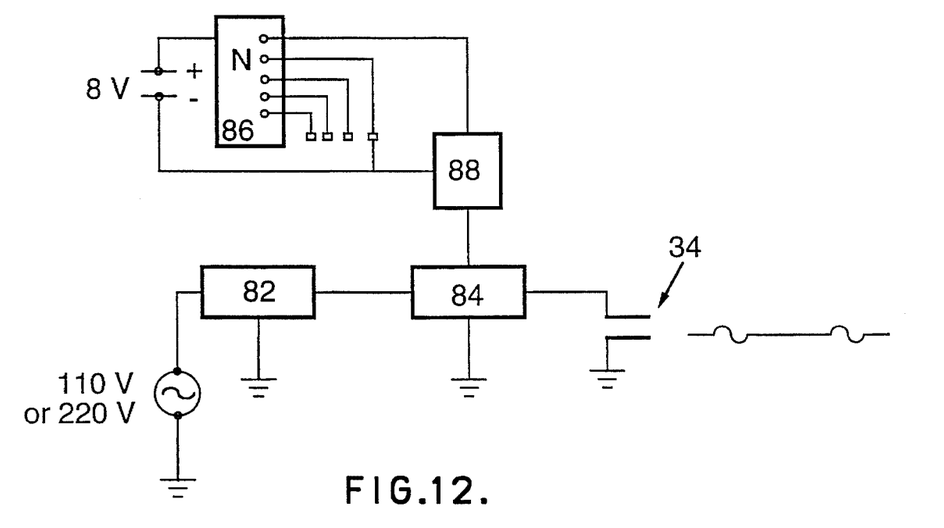

FIG. 12 is a schematic diagram of the circuit in the power supply 48 that is used to create an intermittent voltage waveform in the wires. A continuous 110-volt 60-hertz waveform enters variable & step-up transformer 82. The output of transformer 82 enters solid state relay 84. A trigger input, created by frequency divider 86 and variable width trigger 88, activates relay 84. The resulting output of relay 84 is an intermittent voltage waveform in the form of a series of spaced single waveforms each of 60-hertz frequency. Each of those single waveforms is separated from adjacent single waveforms by a time interval which approximates ten times the period of the single waveform.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A zebra mussel control device adapted to be fitted over a water intake pipe extending vertically with a top cover and a cylindrical side opening below the top cover, the control device comprising:

(a) an electrode support member adapted to be supported on the top cover, the support member being sized such that a peripheral portion extends beyond the top cover;

(b) a series of electrodes supported at equiangular positions on the support member, each electrode being attached to the peripheral portion of the support member so as to extend normal to that member outside of the top cover, each electrode being radially oriented on the support member and being electrically insulated from that member, the length of the electrodes being such that they substantially cover the cylindrical side opening of the intake pipe, an electrical current being adapted to flow between adjacent electrodes; and, (c) an annular air chamber adapted to be fitted around the water intake pipe below the cylindrical side opening, the air chamber having a series of apertures for releasing air from the chamber, the released air flowing upwardly, as bubbles, through gaps between the electrodes;

whereby, when the device is in use the flow of air bubbles through the gaps creates a water turbulence which increases the destructive effect of the electrical current flowing across the gaps on any zebra mussels entering the water intake through the gaps.

2. A zebra mussel control device as in claim 1, wherein the peripheral portion of the support member has a series of radial fingers extending at equiangular positions, each electrode being supported by a respective radial finger.

3. A zebra mussel control device as in claim 1, wherein the electrical current flowing between adjacent pairs of electrodes is driven by an intermittent alternating voltage waveform.

4. A zebra mussel control device as in claim 3, wherein the intermittent voltage waveform is a series of spaced single waveforms of 60-hertz frequency, each of the single waveforms being separated from adjacent single waveforms by a time interval approximating ten times the period of the single waveform.

5. A zebra mussel control device as in claim 1, and also comprising an intermittent voltage waveform power supply having first and second electrical output wires, wherein every second electrode supported on the support member is connected to the first output wire, and wherein all of the other electrodes are connected to the second output wire.

6. A zebra mussel control device as in claim 1, and also comprising an intermittent voltage waveform power supply having first and second and third electrical output wires, wherein every third electrode supported on the support member is connected to the first output wire, wherein every electrode on the one side of each of the third electrodes is connected to the second output wire, and wherein every electrode on the other side of every third electrode is connected to the third output wire.

7. A zebra mussel control device as in claim 1, wherein the annular air chamber has a circular cross-section.

8. A zebra mussel control device for a water intake, the device comprising:

(a) a funnel member having its smaller end adapted to be fitted to a pipe of the water intake, and having an axis of symmetry extending generally vertically, the larger end of the funnel member having a circumference extending generally horizontally;

(b) a cover member with a circumference in spaced parallel relationship with the circumference of the funnel member;

(c) a series of electrodes extending generally vertically between the circumference of the funnel member and the circumference of the cover member, each electrode extending generally radially on the cover member and being separated from each adjacent electrode by a gap of uniform size, an electrical current being adapted to flow between adjacent electrodes; and, (d) an annular air chamber surrounding the funnel member, the air chamber having a series of apertures for releasing air from the chamber, the released air flowing upwardly, as bubbles, through the gaps between the electrodes;

whereby, when the device is in use the flow of air bubbles through the gaps creates a water turbulence which increases the destructive effect of the electrical current flowing across the gaps on any zebra mussels entering the water intake through the gaps.

9. A zebra mussel control device as in claim 8, wherein the funnel member and the cover member each has a series of radial fingers connected at equiangular positions on its circumference, and wherein each electrode is mounted to extend between one of the fingers on the funnel member and a corresponding finger on the cover member.

10. A zebra mussel control device as in claim 9, wherein each radial finger is integrally connected to either the funnel member or the cover member.

11. A zebra mussel control device as in claim 9, wherein the electrical current flowing between adjacent pairs of electrodes is driven by an intermittent alternating voltage waveform.

12. A zebra mussel control device as in claim 11, wherein the intermittent voltage waveform is a series of spaced single waveforms of 60-hertz frequency, each of the single waveforms being separated from adjacent single waveforms by a time interval approximating ten times the period of the single waveform.

13. A zebra mussel control device as in claim 8, and also comprising an intermittent voltage waveform power supply having first and second electrical output wires, wherein every second electrode extending around the funnel member is connected to the first output wire, and wherein all of the other electrodes are connected to the second output wire.

14. A zebra mussel control device as in claim 8, and also comprising an intermittent voltage waveform power supply having first and second and third electrical output wires, wherein every third electrode extending around the funnel member is connected to the first output wire, wherein every electrode on the one side of each of the third electrodes is connected to the second output wire, and wherein every electrode on the other side of every third electrode is connected to the third output wire.

15. A zebra mussel control device as in claim 8, wherein the annular air chamber has a circular cross-section.

16. A zebra mussel control device for a water intake, the device comprising:

(a) a flared funnel member, the funnel member having a circular cross-section and small and large circular ends, the small end being adapted to be fitted to a pipe of the water intake, the axis of symmetry of the funnel member extending generally vertically;

(b) a cover member in spaced parallel relationship with the large end of the funnel member;

(c) a series of electrodes extending generally vertically between a periphery of the cover member and the large end of the funnel member, the electrodes being held between respective equiangularly-positioned radial projections of the cover and funnel members such that the gap between adjacent electrodes is unbounded on the top and bottom, an electrical current being adapted to flow between adjacent electrodes; and, (d) an annular air chamber surrounding the funnel member, the air chamber having a series of apertures for releasing air from the chamber, the released air flowing upwardly, as bubbles, around the outside of the flared funnel member and then through the gaps between the electrodes;

whereby, when the device is in use the flow of air bubbles through the gaps creates a water turbulence which increases the destructive effect of the electrical current flowing across the gaps on any zebra mussels entering the water intake through the gaps.

\* \* \* \* \*